March 13, 1928.
H. L. HEGLAND
COMBINED DRAFT AND STEERING GEAR
Filed July 26, 1927  2 Sheets-Sheet 2
1,662,671
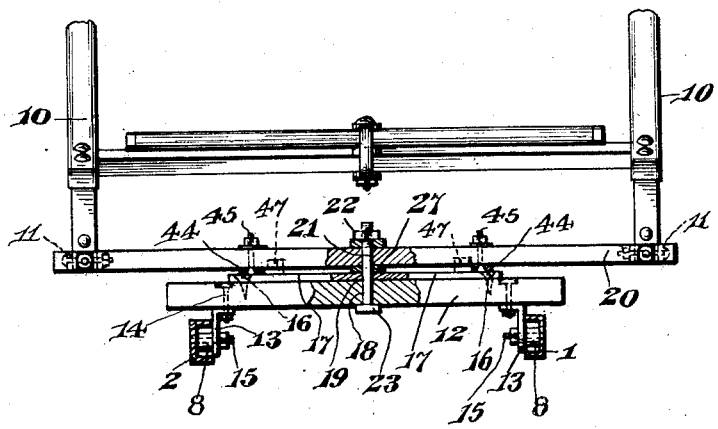
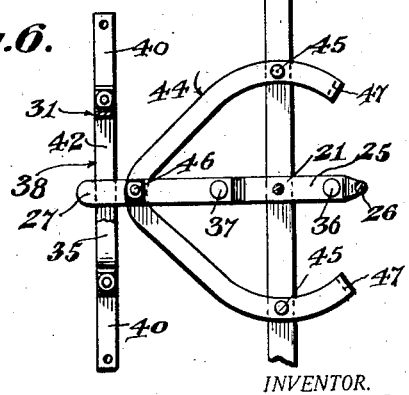
INVENTOR.
Harry L. Hegland,
BY
Geo. P. Kimmel.  ATTORNEY.

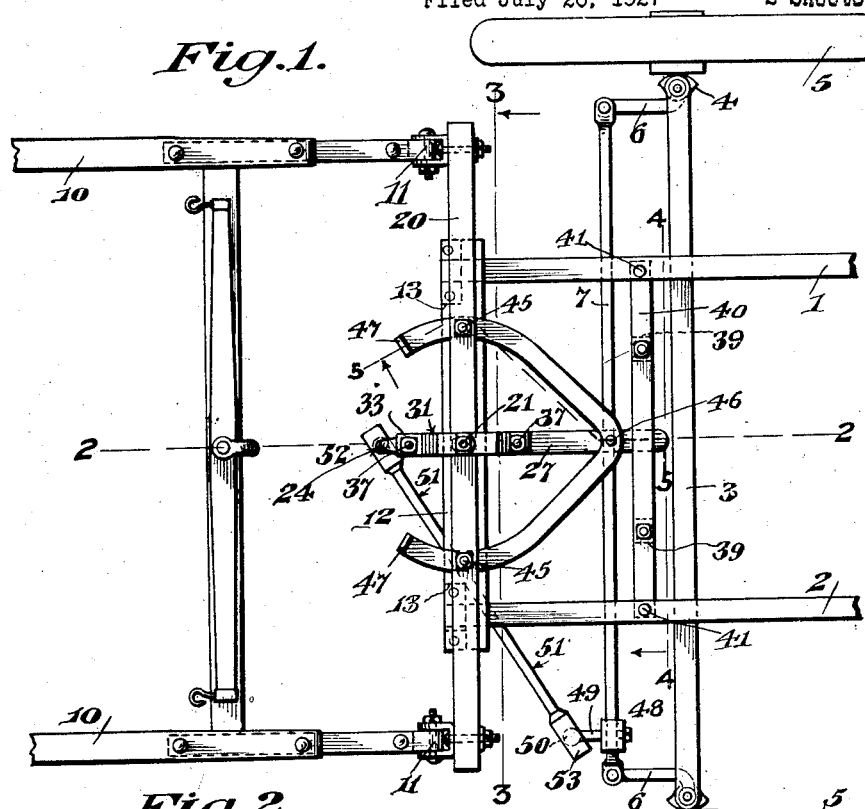

Patented Mar. 13, 1928.

1,662,671

UNITED STATES PATENT OFFICE.

HARVY L. HEGLAND, OF AITKIN, MINNESOTA.

COMBINED DRAFT AND STEERING GEAR.

Application filed July 26, 1927. Serial No. 208,590.

This invention relates to a combined draft and steering gear for horse drawn vehicles, and has for its object to provide, in a manner as hereinafter set forth, a gear of such class actuated, by the animal when changing from one direction of travel to another, to provide for the steering of the front wheels of the vehicle to guide the latter in the desired direction of movement.

Further objects of the invention are to provide, in a manner as hereinafter set forth, a combined draft and steering gear for horse drawn vehicles, which is simple in its construction and arrangement, strong, durable, compact, readily installed with respect to the vehicle, thoroughly efficient in its use, and comparatively inexpensive to manufacture.

With the foregoing and other objects in view, the invention consists of the novel construction, combination and arrangement of parts as hereinafter more specifically described, and illustrated in the accompanying drawings, wherein is shown an embodiment of the invention, but it is to be understood that changes, variations and modifications can be resorted to which fall within the scope of the claims hereunto appended.

In the drawings wherein like reference characters denote corresponding parts throughout the several views:

Figure 1 is a top plan view of a combined draft and steering gear in accordance with this invention and showing the adaptation thereof in connection with the front of a horse drawn vehicle.

Figure 2 is a section on line 2—2 Figure 1.
Figure 3 is a section on line 3—3 Figure 1.
Figure 4 is a section on line 4—4 Figure 1.
Figure 5 is a section on line 5—5 Figure 1.

Figure 6 is a fragmentary view, in inverted plan, of the combined draft and steering gear.

Referring to the drawings in detail 1 and 2 denote the side bars of the chassis of a vehicle and which have their forward ends connected together in a manner as hereinafter referred to. The axle of the vehicle is indicated at 3 and has connected therewith, at each end thereof a pivoted knuckle 4 provided with a spindle, not shown, for a front wheel 5. Each knuckle 4 is formed with a forwardly directed shifting arm 6. The arms 6 have interposed therebetween, as well as pivotally connected therewith, a connecting rod or bar 7 to provide for the synchronous shifting of the knuckles 4 when steering the front wheels of the vehicle. The foregoing elements are of known construction, with the exception that the arms 6 project forwardly from and the bar 7 is arranged forwardly of the axle 3, not at the rear thereof. The rearward disposition of the arms 6 and bar 7 is generally employed in steering mechanisms used in connection with motor vehicles. Front springs 8 are connected to the side bars 1 and 2 and also with the axles 3. The arms 6 are positioned below the axle 3. The rear ends of the springs 8 are connected by pivotal means therefor, as at 9 to the side bars 1 and 2 and the forward ends of the springs 8 are connected to the forward ends of the side bars 1 and 2 in a manner to be presently referred to. The shafts of the vehicle are indicated at 10 and the thill couplings at 11.

A combined draft and steering gear, in accordance with this invention, includes a supporting bar 12, which is mounted upon a pair of spaced depending brackets or angle irons 13. Holdfast devices 14 are employed for securing the brackets 13 against the lower face of the support 12. Each bracket is positioned between the transverse center and an end of the support 12 and the latter is of a length to project laterally from each of the side bars 1, 2 of the chassis. The support 12 is positioned over the forward ends of the side bars 1, 2 of the chassis. The brackets 13 are positioned against the inner face of said side bars 1, 2 and are secured therewith by the holdfast devices 15, and these latter constitute means for pivotally connecting the forward ends of the springs with the forward ends of the side bars 1, 2. Positioned upon the upper face of the support 12, as well as secured therewith by the holdfast devices 16, is a wear plate 17, which is of less length than the length of the support 12. The support 12, as well as the plate 17, is formed with a centrally disposed opening. The opening in the support is indicated at 18 and the opening in the plate at 19 and said openings are arranged in registration.

Arranged in superposed relation with respect to the support 12, as well as being of greater length and of less width than said support 12, is a draft bar 20 carrying at the ends of the front edge thereof the thill couplings 11. The draft bar 20 is connected to the support 12, by a pivot bolt 21 which projects above the bar 20 and carries a clamping nut 22 which threadably engages with the upper terminal portion of the bolt 19. The head 23 of the bolt 21 abuts against the lower face of the support 12.

Interposed between the wear plate 17 and the draft bar 20, is a combined draft bar guide and steering arm shifting member formed from a strip or strap of metal of the desired gauge and length and which is referred to generally by the reference character 24. The member 24 comprises an intermediate portion 25, a depending forward end portion 26 and a rear end portion 27, which is offset to be positioned below the intermediate portion 25, and the latter is interposed between the draft bar 20 and wear plate 17 and is formed with an opening 28 for the passage of the pivot bolt 21. The member 24 is formed with a short rearwardly extending and downwardly inclined portion 29, which provides for the offsetting of the portion 25 relative to the portion 27 or vice versa. The portion 29 also constitutes an abutment for a brace element to be presently referred to. The forward end portion 26, as before stated depends, and it is disposed at right angles with respect to the intermediate portion 25. The portion 26 has a globular free end 30, as indicated in dotted lines in Figure 2, and which forms one of the sections of a universal joint connection to be presently referred to.

Overlapping the draft bar 20, centrally thereof, as well as being connected to the member 24, is a brace element referred to generally by the reference character 31, and which comprises an inverted V-shaped intermediate portion 32 and a front and a rear end portion 32, 33 respectively. The rear arm end portion 32 of the brace element and of the portion 32 of the brace element and of which is indicated at 35, is of greater length than the forward arm of said portion 32. The portion 32 is mounted upon the top of the draft bar 20 and extends forwardly and rearwardly with respect thereto. The end portion 33 of the brace element 31, is mounted forwardly upon the upper face of the intermediate portion 25 of the member 24. The said end portion 33 is fixedly secured to the intermediate portion 25 by the holdfast device 36. The rear arm 35 of the intermediate portion 32, of the brace element 31, abuts against the portion 29 of the element 24, and the rear end portion 34 of the element 31, is mounted upon the end portion 27, of the member 24, and is fixedly secured thereto, by the holdfast device 37. The rear end portion 27 of the member 24, projects rearwardly from the end portion 34 of the element 31, and is supported upon and fixedly secured to the end portion 27, of the member 24 by the holdfast device 37.

The rear end portion 27 of the member 24, projects rearwardly from the end portion 34 of the element 31, and is supported upon the base of a guide 38. The guide 38 is yoke-shaped and has the upper end of of each of the arms thereof, formed with a right angularly disposed flange 39 bearing against the lower face of a connecting member 40, which is interposed between the side bars 1, 2 of the chassis. The ends of the connecting bar 40 are secured to the side bars 1, 2 of the chassis, by the holdfast devices 41. The arms of the guide 38, or rather the flanges formed on the arms of said guide are interposed between the transverse center and the ends of the bar 40. The base of the guide 38, in connection with the bar 40, provides a guide passage 42, for the rear terminal portion of the member 24. The intermediate portion 32 of the brace element 31 is provided with an opening 43 for the passage of the pivot bolt 21. The clamping nut 22 bears against the upper face of the intermediate portion 32, of the brace element 31.

Connected to the draft bar 20 and positioned against the lower face thereof, is a combined brace and coupling member 44 for the member 24. The member 44 is in the form of a hound. The member 44 has each of its arms secured to the lower face of the draft bar 20, by a holdfast device 45. The rear end of the member 44, is fixedly secured to the rear end terminal portion 27, of the member 24, by the holdfast device 46. The arms of the member 44 project forwardly from the draft bar 20 an appropriate distance, and each of the arms of the member 44 at its forward end is provided with an upturned flange 47.

Secured to the connecting rod or bar 7, in proximity to one end thereof, is a sleeve or collar 48 formed with a forwardly directed stem 49 having its free end provided with a globular enlargement 50 which forms one of the sections of a universal joint connection to be presently referred to. Interposed between the member 24 and the stem 49 is a downwardly inclined and rearwardly extending steering arm 51 formed with a pair of heads 52, 53, and the former is provided with a spherical recess for the reception of the globular head 30 on the free end of the forward end portion 26 of the member 24. The head 53 is formed with a spherical recess for the reception of the globular enlargement 50 on the stem 49. The globular enlargement 30 on the end portion 26, in connection with the recess formed in the head 52, provides a universal joint connection between the steering arm 51 and the member 24, and the globular enlargement 50, on the stem 49, in connection with the spherical recess formed in the head 53, provides a universal joint connection between the steering arm 51 and the connecting rod or bar 7. The head 52 is arranged at the upper end of the arm 51 on the head 53 at the lower end of said arm.

Although the combined draft and steering gear is illustrated, by way of example in connection with a one-horse-drawn vehicle, yet it is to be understood that the gear can be employed in connection with a double team. From the construction referred to, it is obvious that a combined draft and steering gear for horse drawn vehicles is set up, and is so arranged that the gear will be actuated, by the animal, when changing from one direction of travel to another, to provide for the steering of the front wheels of the vehicle to guide the latter in the desired direction of movement, and therefore it is thought that the many advantages of a combined draft and steering gear, in accordance with this invention, can be readily understood, and although the preferred embodiment of the invention is as illustrated and described, yet it is to be understood that changes in the details of construction can be had which will fall within the scope of the invention as claimed.

What I claim is:

1. A combined draft and steering gear for horse drawn vehicles comprising a support adapted to be secured with the body of the vehicle forwardly thereof, a draft bar for connection with the shaft of the vehicle, pivotally connected with said support and adapted to be shifted by the animal on a change in the direction of travel thereof, a combined draft bar guide and steering arm actuating member extending forwardly and rearwardly with respect to said bar and bodily shifted with the latter, means for connecting said member to said bar, a steering arm, means for connecting the forward end of said arm to the forward end of said member, and means for connecting the rear end of said arm with the steering means for the front wheels of the vehicle.

2. A combined draft and steering gear for horse drawn vehicles in accordance with claim 1, a brace element overlapping said draft bar and connected to said member forwardly and rearwardly with respect to the draft bar.

3. A combined draft and steering gear for horse drawn vehicles in accordance with claim 1, guiding means connected with the body of the vehicle for the rear end of said member.

4. A combined draft and steering gear for horse drawn vehicles, in accordance with claim 1, the positioning of said steering arm to extend rearwardly with respect to the forward end of said member and at a downward inclination.

5. A combined draft and steering gear for horse drawn vehicles in accordance with claim 1, the means for connecting the forward end of the steering arm to the forward end of said member being in the form of a universal joint, and the means for connecting the rear end of the steering arm with the steering means for the front wheels of the vehicle being in the form of a universal joint.

In testimony whereof, I affix my signature hereto.

HARVY L. HEGLAND.